United States Patent
Ansari et al.

(10) Patent No.: US 9,544,233 B2
(45) Date of Patent: Jan. 10, 2017

(54) CONGESTION MANAGEMENT FOR DATACENTER NETWORK

(71) Applicant: New Jersey Institute of Technology, Newark, NJ (US)

(72) Inventors: Nirwan Ansari, Montville, NJ (US); Yan Zhang, Harrison, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 0 days.

(21) Appl. No.: 14/436,047

(22) PCT Filed: Apr. 28, 2014

(86) PCT No.: PCT/US2014/035742
§ 371 (c)(1),
(2) Date: Apr. 15, 2015

(87) PCT Pub. No.: WO2015/167437
PCT Pub. Date: Nov. 5, 2015

(65) Prior Publication Data
US 2016/0087898 A1    Mar. 24, 2016

(51) Int. Cl.
*H04L 12/803* (2013.01)
*H04L 12/18* (2006.01)
(Continued)

(52) U.S. Cl.
CPC ........... *H04L 47/125* (2013.01); *H04L 12/18* (2013.01); *H04L 43/16* (2013.01); *H04L 47/10* (2013.01); *H04L 47/11* (2013.01); *H04L 47/122* (2013.01)

(58) Field of Classification Search
CPC ........... H04L 43/00–43/50; H04L 47/10–47/41
See application file for complete search history.

(56) References Cited

U.S. PATENT DOCUMENTS

2002/0181494 A1    12/2002  Rhee
2006/0056308 A1     3/2006  Gusat et al.
(Continued)

OTHER PUBLICATIONS

"Software-defined networking," Retrieved from URL: https://web.archive.org/web/20140208065552/http://en.wikipedia.org/wiki/Software-defined_networking, accessed on Nov. 17, 2014, last modified on Feb. 5, 2014, pp. 1-5.
(Continued)

*Primary Examiner* — Pao Sinkantarakorn
(74) *Attorney, Agent, or Firm* — Turk IP Law, LLC (57) ABSTRACT

Technologies are generally described to provide a congestion management system for a datacenter network. According to some examples, the congestion management system may detach management of congestion at the datacenter network from switches of the datacenter network. The congestion management system may also incorporate a distributed detection mechanism that is configured to detect a potential congestion culprit. Furthermore, detachment of the management of the congestion may allow the datacenter network to incorporate switches with limited traffic management capabilities. The switches may monitor a local congestion status and forward the congestion status to a centralized congestion controller that manages the congestion. The congestion management system may also be deployed for a cross-layer congestion management scheme.

14 Claims, 7 Drawing Sheets

(51) Int. Cl.
*H04L 12/26* (2006.01)
*H04L 12/801* (2013.01)

(56) References Cited

U.S. PATENT DOCUMENTS

| | | | |
|---|---|---|---|
| 2011/0090797 A1 | 4/2011 | Beecroft | |
| 2011/0242976 A1 | 10/2011 | Gusat et al. | |
| 2013/0124753 A1 | 5/2013 | Ansari et al. | |
| 2015/0334024 A1* | 11/2015 | Mogul | H04L 47/22 370/237 |

OTHER PUBLICATIONS

The Network Simulator—ns-2, Retrieved from URL: https://web.archive.org/web/20140418033446/http://www.isi.edu/nsnam/ns/, accessed on Nov. 17, 2014, pp. 1-2.

Aghanwan, "Data Center Bridging Task Group," Retrieved from URL: https://web.archive.org/web/20140331063416/http://www.ieee802.org/1/pages/dcbridges.html, accessed on Nov. 17, 2014, Last modified Nov. 13, 2013, pp. 1-2.

Alizadeh, M., et al., "Data Center Transport Mechanisms: Congestion Control Theory and IEEE Standardization," in the 46th Annual Allerton Conference on Communication, Control, and Computing, pp. 1270-1277 (Sep. 23-26, 2008).

Bergamasco, D., "Data Center Ethernet Congestion Management: Backward Congestion Notification," CISCO, IEEE 802.1 Meeting, Berlin, Germany, pp. 1-25 (May 12, 2005).

Crisan, D., et al., "Comparative Evaluation of CEE-based Switch Adaptive Routing," IBM Research, Zürich Research Laboratory, pp. 1-12, Copyright IBM 2010.

Devkota, P. and Reddy, A. L. N., Performance of Quantized Congestion Notification in TCP Incast Scenarios of Data Centers, IEEE International Symposium on Modeling, Analysis Simulation of Computer and Telecommunication Systems (MASCOTS), pp. 235-243 (Aug. 17-19, 2010).

International Search Report and Written Opinion for International Application No. PCT/US14/35742 mailed on Sep. 25, 2014.

Jiang, J., et al., "An Explicit Rate Control Framework for Lossless Ethernet Operation," International Conference on Communication, pp. 5914-5918 (May 19-23, 2008).

Kabbani, A. et al., "AFQCN: Approximate Fairness with Quantized Congestion Notification for Multi-tenanted Data Centers," in Proc. of IEEE the 18th Annual Symposium on High Performance Interconnects (HOTI), pp. 58-65 (Aug. 18-20, 2010).

Liu, X., "Promoting Node-to-Node Congestion Control in Internet," Centre for Communications Systems Research, University of Cambridge, pp. 1-13 (2000).

So-In, C., et al., "Enhanced Forward Explicit Congestion Notification (E-FECN) Scheme for Datacenter Ethernet Networks," International Symposium on Performance Evaluation of Computer and Telecommunication Systems, pp. 542-546 (Jun. 16-18, 2008).

Zhang, Y., and Ansari, N., "Fair Quantized Congestion Notification in Data Center Networks," IEEE Transactions on Communications, vol. 61, Issue 11, pp. 4690-4699 (Oct. 25, 2013).

Zhang, Y., and Ansari, N., "On Architecture Design, Congestion Notification, TCP Incest and Power Consumption in Data Centers," IEEE Communications Surveys Tutorials, vol. 15, Issue 1, pp. 39-64 (Jan. 11, 2012).

* cited by examiner

CONGESTION MANAGEMENT FOR DATACENTER NETWORK

CROSS-REFERENCE TO RELATED APPLICATION

This Application is the U.S. National Stage filing under 35 U.S.C. §371 of PCT Application Ser. No. PCT/US14/35742 filed on Apr. 28, 2014. The PCT application is hereby incorporated by reference in its entirety.

BACKGROUND

Unless otherwise indicated herein, the materials described in this section are not prior art to the claims in the application and are not admitted to be prior art by inclusion in this section.

Datacenters may become pertinent to providing diverse applications and services along with the emergence of cloud based computing services. Construction of an efficient network in datacenter environments may be of importance to datacenter providers. Congestion notification and management may have relevancy to construction of an efficient network for datacenters. Due to inherent properties of Ethernet, such as low cost, ubiquitous connectivity, and ease of management, Ethernet may be a primary network protocol to provide a consolidated network solution for datacenter networks (DCNs). However, Ethernet may have been originally designed for best-effort communications in a local area network (LAN) solution. As such, Ethernet may not be optimized for DCNs.

SUMMARY

The present disclosure generally describes methods, apparatus, systems, devices, and/or computer program products related to a congestion management system for a datacenter network.

According to some embodiments, methods to provide a congestion management system for a datacenter network are described. An example method may include receiving a congestion status of the datacenter network from one or more congestion detectors, receiving flow rate information from one or more traffic flow monitors of end hosts, determining congestion status information based on the congestion status and the flow rate information, identifying one or more congestion culprits as a subset of the end hosts that cause a network congestion of the datacenter network based on the congestion status information and the flow rate information, and transmitting one or more congestion messages to the one or more congestion culprits to allow one or more actions to resolve the network congestion to be performed by congestion reaction coordinators of the end hosts.

According to other embodiments, a system configured to manage a congestion for a datacenter network is described. An example system may include a congestion controller communicatively coupled to one or more congestion detectors, each of the one or more congestion detectors communicatively coupled to one or more traffic flow monitors and one or more congestion reaction coordinators of end hosts. The congestion controller may be configured to receive a congestion status of the datacenter network, receive flow rate information from the traffic flow monitors of the end hosts, determine congestion status information based on the congestion status and the flow rate information, identify one or more congestion culprits as a subset of the end hosts that cause the network congestion of the datacenter network based on the congestion status information and the flow rate information, and transmit one or more congestion messages to the one or more congestion culprits to allow the one or more congestion reaction coordinators to perform one or more actions to resolve the network congestion.

According to further embodiments, computer-readable storage mediums with instructions stored thereon to provide a congestion management system for a datacenter network are described. The instructions, in response to execution by a processor, may cause the processor to perform actions that are similar the actions described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

The disclosure is generally drawn, inter alia, to methods, apparatus, systems, devices, and/or computer program products related to datacenter network congestion management.

Briefly stated, technologies are generally described to provide a congestion management system for a datacenter network. According to some examples, the congestion management system may detach management of congestion at the datacenter network from switches of the datacenter network. The congestion management system may also incorporate a distributed detection mechanism that is configured to detect a potential congestion culprit. Furthermore, detachment of the management of the congestion may allow the datacenter network to incorporate switches with limited traffic management capabilities. The switches may monitor a local congestion status and forward the congestion status to a centralized congestion controller that manages the congestion. The congestion management system may also be deployed for a cross-layer congestion management scheme.

A datacenter, as used herein, refers to an entity that hosts services and applications for customers through a physical server installations and a virtual machine executed in those server installations. Customers of the datacenter, also referred to as tenants, may be organizations that provide access to their services by multiple customers.

Figure 1:
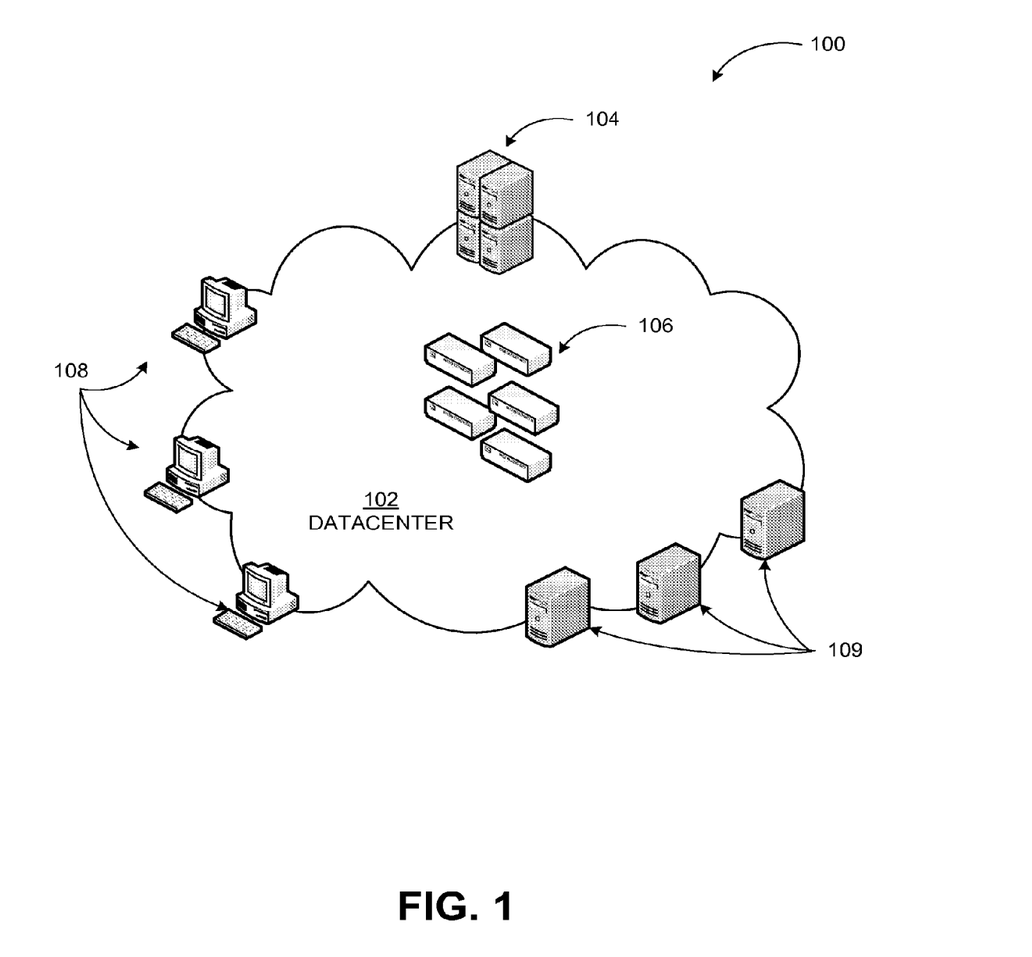
FIG. 1 illustrates an example high level diagram of a congestion management system for a datacenter network.

FIG. 1 illustrates an example high level diagram of a congestion management system for a datacenter network, arranged in accordance with at least some embodiments described herein.

As shown in a diagram 100, a datacenter 102 may provide services such as applications, data storage, data processing, or comparable ones to client devices 108 or external servers 109. The datacenter 102 may employ servers 104, devices 106, physical or virtual data stores, and similar ones to provide the services to the client devices 108 and the external servers 109. The devices 106 may include firewalls, routers, and similar ones. An application hosted or data stored by the datacenter 102 for a customer of the datacenter (e.g., owner of the hosted application or data) may include an architecture of hardware and software components. A level of the services provided to the customer may be determined based on a number of service parameters such as a server processing capacity, a memory capacity, and a networking bandwidth.

The datacenter 102 may be a cloud based service provider. The cloud-based service provider may include the devices 106, the client devices 108, and the external servers 109 that are connected through one or more networks to provide one or more services. Cloud-based service providers may have disparate architectures that provide similar services but with service parameters. Examples of the service parameters may include data storage capacity, processing capacity, server latency, and similar aspects that may differ based on an architecture of a cloud-based service provider.

The datacenter 102 may actively manage its network using a congestion controller. The congestion controller may determine congestion status information of the datacenter network from a congestion status and a flow rate information. The congestion status may include one or more congestion values computed by congestion detectors of the datacenter network through samplings of incoming network data packets at the devices 106. The congestion controller may receive the congestion status from the congestion detectors implemented with the devices 106. In addition, the flow rate information may include one or more rate measurements of data traffic flow at one or more of the devices 106. The congestion controller may receive the flow rate information from traffic flow monitors of end hosts such as the client devices 108 and the external servers 109. Furthermore, the end hosts may include any device connected to the datacenter network and allowed to communicate with any other device such as the client devices 108 and the external servers 109. Additionally, the congestion controller may identify congestion culprits as a subset of the end hosts that cause a network congestion of the datacenter network based on the congestion status information and the flow rate information. The congestion controller may then transmit congestion messages to the congestion culprits to allow actions to resolve the network congestion to be performed by congestion reaction coordinators of the congestion culprits.

Figure 2:
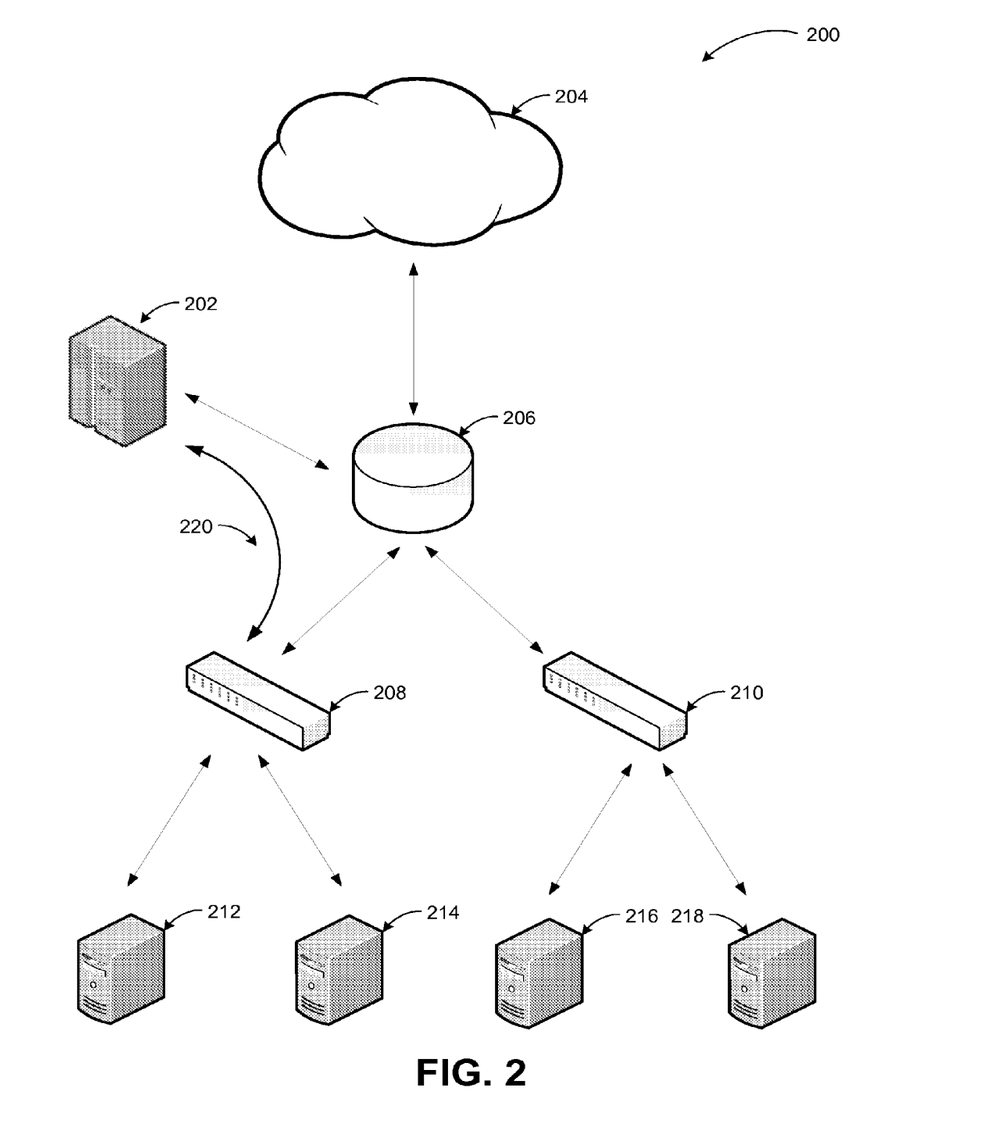
FIG. 2 illustrates an example architecture diagram of a congestion management system for a datacenter network.

FIG. 2 illustrates an example architecture diagram of a congestion management system for a datacenter network, arranged in accordance with at least some embodiments described herein.

As shown in a diagram 200, the congestion management system may include four example components to manage a network congestion at the datacenter network. The components may include a congestion detector 206, a congestion controller 202, traffic flow monitors, and congestion reaction coordinators. The congestion detector 206 may be implemented at switches (208, 210) to detect a congestion status through queue monitoring at the switches (208, 210). The queue monitoring may include sampling and measurement of network data packets that pass through a queue based data structure of one or more of the switches (208, 210). Additionally, a traffic flow monitor and a congestion reaction coordinator may be implemented at each one of end hosts (212, 214, 216, and 218). The traffic flow monitor may estimate sending rates of traffic flow transmitted from an associated end host. The traffic flow monitor may transmit the flow rate information to the congestion controller 202.

The congestion controller 202 may receive the congestion status from the congestion detector 206 and the flow rate information from the traffic flow monitors. The congestion controller 202 may determine congestion status information from the congestion status and the flow rate information. The determination of the congestion status information may include computation and evaluation of the congestion status and the flow rate information against criteria such as one or more thresholds such as a network bandwidth associated with the datacenter network. Additionally, the congestion controller 202 may identify congestion culprits from the end hosts (212, 214, 216, and 218) that cause the network congestion based on the congestion status information. The congestion culprits may be identified based on a set of measurements and computations that may evaluate network resource consumption of the end hosts (212, 214, 216, and 218). In an example scenario, one or more of the end hosts (212, 214, 216, and 218), that consume a network bandwidth that exceeds a threshold, may be identified as the congestion culprits. In addition, the congestion controller 202 may inform the end hosts (212, 214, 216, and 218) of the congestion culprits and the congestion status information through congestion messages. The congestion reaction coordinators associated with the end hosts (212, 214, 216, and 218) may react based on the congestion messages to resolve the network congestion. The congestion coordinators may reduce sending rates of traffic flow associated with the congestion culprits to resolve the network congestion. The congestion controller 202 may also relay the congestion status information through the congestion detector 206 to other datacenter network congestion management entities in a cloud based services provider 204.

The congestion detector 206 may be deployed at the switches (208, 210) to detect network congestion at the switches (208, 210). In an example scenario, the congestion detector 206 may sample incoming packets at a time t with a sampling probability of p(t). The congestion detector may compute a congestion value $F_b$ (t). The sampling probability may be initialized to 1%. The sampling probability may be updated after a computation of the congestion value $F_b$ (t) at each sampling event. A value $Q_{len}$ (t) and a value $Q_{len}$ (t−τ) may be determined as an instantaneous queue length in bits of a current sampling event at time t and a last sampling event at time t−τ, respectively, where τ may be a time interval between two adjacent sampling events. The congestion value $F_b$ (t) may include a weighted sum of an instantaneous queue offset $Q_{over}$ (t)=$Q_{len}$ (t)−$Q_{eq}$, where a value $Q_{eq}$ may be an equilibrium queue length, and a queue variation over a last sampling interval $Q_\delta$ (t)=$Q_{len}$ (t)−$Q_{len}$ (t−τ), as defined by:

$$F_b(t) = -(Q_{over}(t) + w * Q_\delta(t)) \quad (1)$$

where w may be a non-negative constant, an example of which may be 2 for a baseline implementation of the congestion value $F_b$(t).

If the congestion value $F_b$ (t) may be a negative value, a congestion notification message that includes the congestion value $F_b$ (t) may be transmitted to the congestion controller 202. The congestion value $F_b$ (t) may be determined as a value $\Psi(F_b$ (t)), a source of the sampled packet, as well as an identification of a congested link (that is expressed as addresses of two end nodes that connects to the congested link). Alternatively, no congestion notification message may be generated. The value $\Psi(F_b$ (t)) may be used to inform the congestion controller 202 about a severity of the network congestion. The identification of the congested link may be used to distinguish where the network congestion occurs. The source of the sampled packet may be identified as a congestion culprit if no flow information related to the congested link may have been collected by the congestion controller 202. The source of the sampled packet may be identified as the congestion culprit because the flow rate information collected at the end hosts (212, 214, 216, 218) may experience longer delays than the congestion status collected by the congestion detector 206 associated with the switches (208, 210).

At each sampling event, the sampling probability of p(t) may be updated as a function of the congestion value $F_b$ (t) as follows:

$$p(t) = \begin{cases} 1 + \frac{9}{64}\Psi(F_b(t)) & (F_b(t) < 0) \\ 1\% & (F_b(t) \geq 0) \end{cases} \quad (2)$$

The traffic flow monitor may count an amount of traffic measured in bytes for each flow originating from an associated end host during a time interval Ts seconds. The traffic flow monitor may estimate a transmission rate for each flow. The estimated transmission rate for a traffic flow i may be determined as a value $B_i$. The estimated transmission rate may be updated every Ts milliseconds (ms) as follows:

$$B_i = (1-\beta)B_i + \beta B_i' \quad (3)$$

where a value $B_i'$ may be the estimated transmission rate of the traffic flow i during a last Ts interval. A value $\beta \in (0, 1)$ may be a weight of the estimated transmission rate $B_i'$ against a previous estimation of $B_i$.

If the estimated transmission rate of the traffic flow i, $B_i$, may be larger than a rate threshold, then the traffic flow i may be assumed to be a potential congestion culprit. The flow monitor may periodically estimate the transmission rate for each flow that originates from the associated end host. The traffic flow monitor may update the flow rate information of the potential congestion culprits that includes the estimated transmission rate and a flow identification tuple. The flow identification tuple may include a couple of values that represent the traffic flow, such as the source and destination addresses of the congestion culprits, and the source and destination port numbers of the congestion culprits, to the congestion controller 202.

The congestion controller 202 may execute a congestion control intelligence computation based on the flow rate information collected by the flow monitors and the congestion status collected by the congestion detector 206 in response to receiving the flow rate information and the congestion status. The congestion controller 202 may determine the congestion status information from the flow rate information and the congestion status. The congestion controller 202 may identify the congestion culprits based on the congestion status information. In addition, the congestion controller 202 may inform the congestion culprits of the congestion status information through congestion messages transmitted through a multicast transmission.

The congestion status received from the congestion detector 206 associated with the switches (208, 210) may include the value $\Psi(F_b$ (t)).

The congestion message, associated with one of the switches (208, 210), may include the quantized congestion information value $\Psi(F_b$ (t)), the source of the sampled packet, and the identification of a congested link 1. The value $\Psi(F_b$ (t)) may be used to retrieve a flow information of the congestion culprits on the congested link 1, determined as a set $T_1$. If the flow information of the set $T_1$ may be empty (for example: no flow information of the congestion culprits related to link 1 may be stored at the congestion controller 202), the congestion controller 202 may continue an execution of a quantized congestion notification (QCN) computation, in which the congestion message may be transmitted to the source of the sampled packet with the value $\Psi(F_b$ (t)). Alternatively, a fair QCN (FQCN) computation such as a congestion control computation based on per-flow information may be utilized for congestion control.

A fair share for each flow i on link 1 may be estimated as:

$$M_i = \frac{W_i}{\sum_{k \in T_l} W_k} \sum_{k \in T_l} B_k \quad (4)$$

where $W_i$ may a weight coefficient for the traffic flow i, which may be determined by a traffic class, the source address, the destination address, and similar ones. A set of $T_l$ may include traffic flows that traverse over a link 1. A parameter $k \in T_l$ may represent one traffic flow in the set $T_l$. The traffic flow i (whose estimated transmission rate $B_i$ may be equal or larger than its estimated fair share $M_i$ ($B_i < M_i$)) may be considered as a low rate traffic flow. Alternatively, the traffic flow i may be assigned to a high rate source of a set $T_1^H = \{i \in T_l | B_i \geq M_i\}$.

The fair share may be fine-grained among the high rate source of the set $T_1^H$ as:

$$M_i^F = \frac{W_i}{\sum_{k \in T_l^H} W_k} \sum_{k \in T_l^H} B_k \quad (5)$$

The congestion culprits may be identified by comparing the estimated transmission rate $B_i$ with the fair share $M_i^F$. A traffic flow i (whose estimated transmission rate $B_i$ may be equal to or larger than its estimated fine-grained fair share $M_i^F$ ($B_i \geq M_i^F$)) may be determined as an overrated flow. The traffic flow i may be identified as the congestion culprit. A number of overrated flows may form an overrated flow set $T_l^R = \{i \in T_l | B_i \geq M_i\}$.

For each congestion culprit, i, the quantized congestion feedback value $\Psi_{F_b}(i,t)$ in the congestion notification message to the source of the congestion culprit i may be computed as follows:

$$\Psi_{F_b}(i, t) = \frac{B_i / W_i}{\sum_{k \in T_l} B_k / W_k} \Psi(F_b(t)) \quad (6)$$

Operations of a congestion reaction coordinator may be same as the operations associated with equation 5 executed at the QCN computation. The congestion reaction coordinator may adjust a transmission rate of an associated traffic source by a decrease of the transmission rate based on the quantized congestion feedback value included in the congestion message. The congestion reaction coordinator may also increase the transmission rate to recover a lost bandwidth and probe for available bandwidth in the datacenter network.

A rate decrease by the congestion reaction coordinator may be initiated when the congestion message is received by an associated end host. The congestion reaction coordinator may reduce the transmission rate to resolve the network congestion based on the congestion message. A current sending rate $R_c(t)$ may be set as a target rate $R_T(t)$ and the current rate may be reduced by a factor of $R_c(t)G_d\Psi(F_b(t))$ as follows:

$$R_T(t) = R_c(t)$$

$$R_c(t) = R_c(t)(1 - G_d\Psi(F_b(t))) \quad (7)$$

where $G_d$ may be a constant and may be configured to a value of 1/128.

A rate increase by the congestion reaction coordinator may be executed through two modules, Byte Counter (BC) and Rate Increase Timer (RIT). BC and RIT may work in two phases, Fast Recover (FR) and Active Increase (AI), based on a state of BC, $S_{BC}$, and a state of RIT, $S_{RIT}$, respectively. If a value of $S_{BC}$ may be smaller than a threshold value $S_T$ (where $S_T$ may be set to a value of 5 in the baseline implementation of the congestion reaction coordinator), BC may be in the FR phase. Alternatively, BC may be in the AI phase. Similarly, RIT state in the FR or AI phase may be determined based on a comparison of $S_{RIT}$ and $S_T$. Initially, both BC and RIT may be in the FR phase and $S_{BC}$ and $S_{RIT}$ may be set to 0. $S_{BC}$ may be increased by 1 for every value $B_L$ or $B_L/2$ bytes transmitted if BC may be in the FR or AI phase, respectively. A value $B_L$ may include a number of bytes transmitted to complete one byte counter cycle. RIT may also function similarly to BC. In the FR phase, RIT may increase $S_{RIT}$ by 1 for every T ms duration. While in the AI phase, $S_{RIT}$ may be increased by 1 for every T/2 ms time duration. Both BC and RIT may raise a rate increase event, when $S_{BC}$ or $S_{RIT}$ may be increased, respectively. When a rate increase event may occur, the current rate $R_c(t)$ and target rate $R_T(t)$ may be updated as follows:

$$R_T(t) = \begin{cases} R_T(T) & \text{(both } BC \text{ and } RIT \text{ in } FR) \\ R_T(t) + R_{HAI} & \text{(both } BC \text{ and } RIT \text{ in } AI) \\ R_T(t) + R_{AI} & \text{(otherwise)} \end{cases} \quad (8)$$

-continued $$R_c(t) = \frac{1}{2}(R_c(t) + R_T(t)) \quad (9)$$

where a value $R_{AI}$ may be the constant target rate increment if either BC or RIT may be in the AI phase. The value $R_{HAI}$ may be the constant target rate increment if both BC and RIT may be in the AI phase.

Figure 3A:
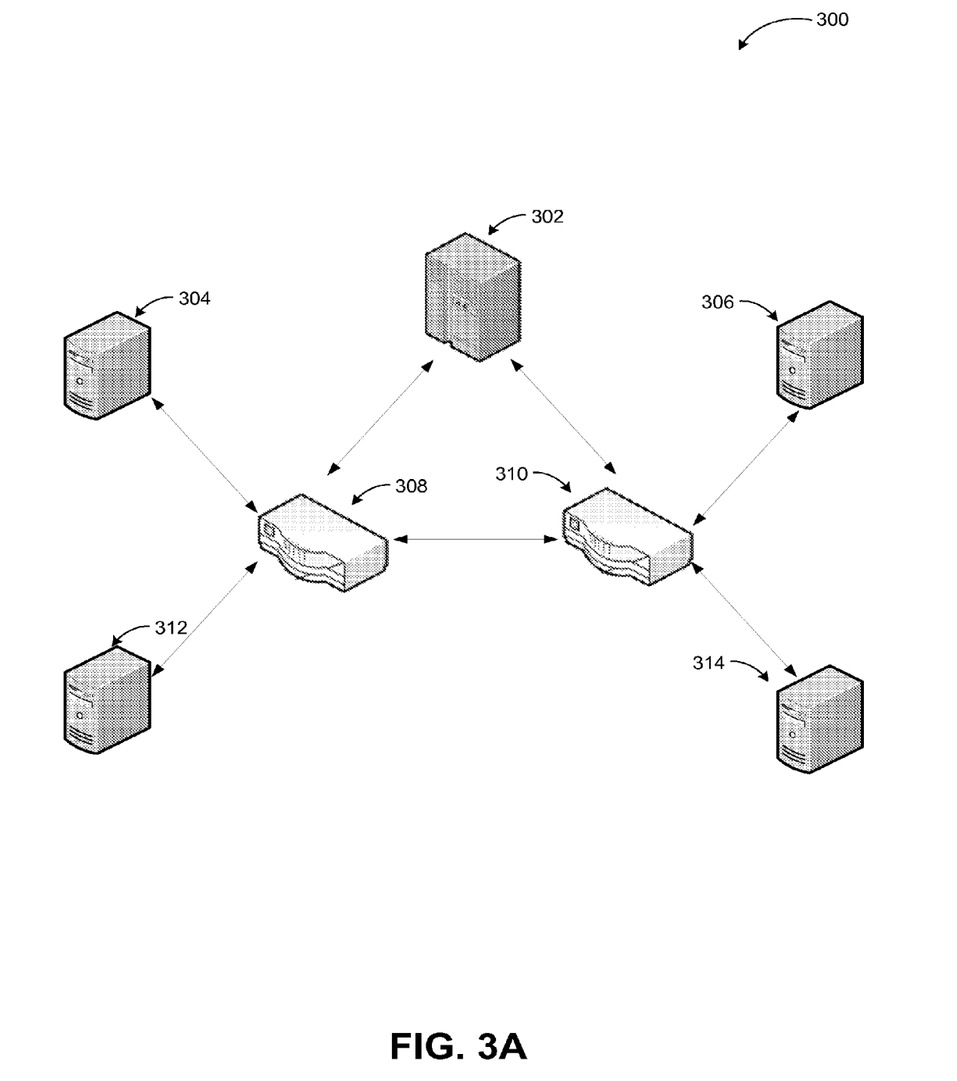
FIGS. 3A and 3B illustrate an example of a simulation of a congestion management system for a datacenter network.
Figure 3B:
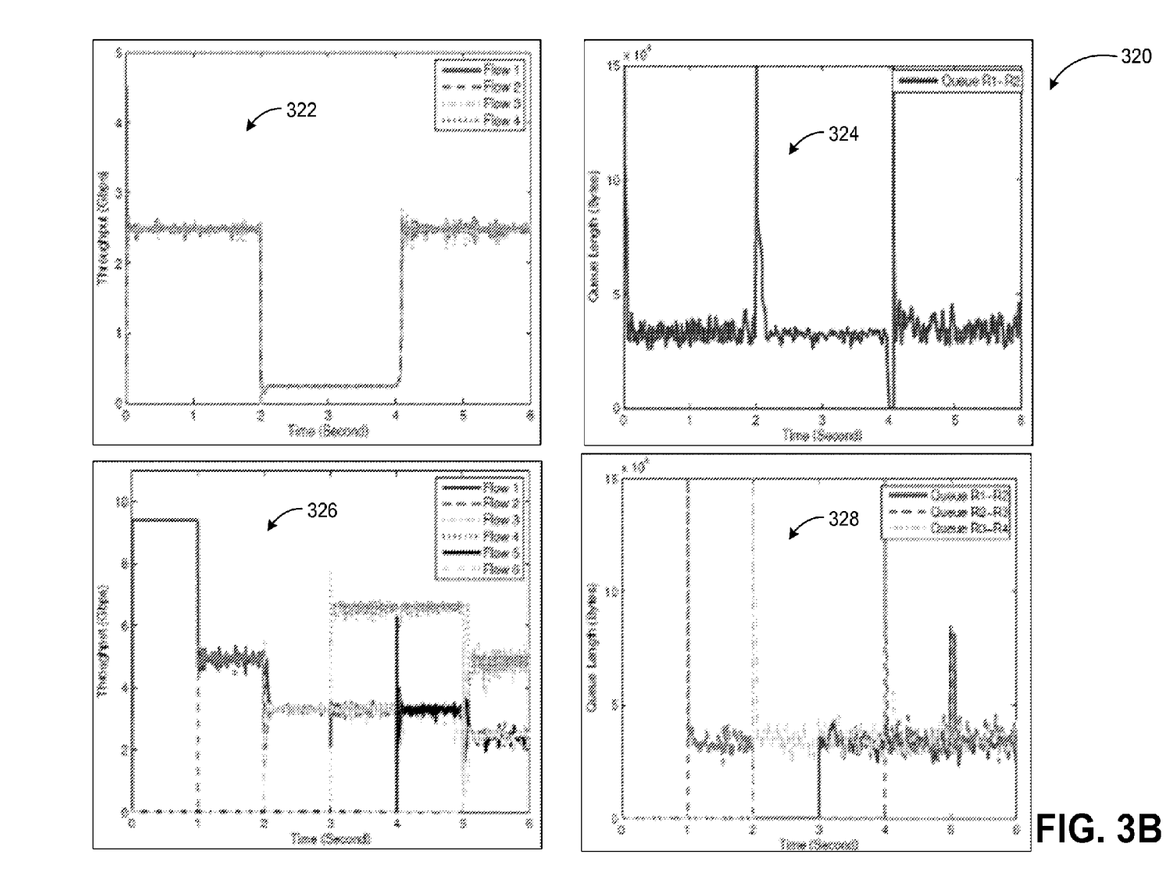

FIGS. 3A and 3B illustrate an example of a simulation of a congestion management system for a datacenter network, arranged in accordance with at least some embodiments described herein.

As shown in a diagram 300, the congestion management system may decouple a congestion control intelligence from switches of the datacenter network. As such, the congestion management system may simplify an implementation and an upgrade of congestion control computations such as a FQCN computation. The congestion management system may also incorporate a distributed congestion culprit detection mechanism. In addition, the switches of the datacenter network may include no state switches that may monitor the congestion status, forward the congestion status to a congestion controller 302, and eliminate a necessity to store per-flow information. Furthermore, the congestion management system may be incorporated with a congestion notification and control computation notwithstanding the per-flow information. The congestion management system may also be deployed for a cross-layer congestion management scheme.

A performance of an example of the congestion management system that incorporates the FQCN computation may be evaluated through a use of a network simulator 2 (NS2). NS2 may include a discrete event based network simulator that provides support for various network simulations such as TCP, routing protocols, and multicast protocol over wired and wireless networks under a number of network topologies. The network topologies may include a dumb-bell topology and a parking-lot topology. The dumb-bell topology may include a network topology that transmits network traffic from a source to a destination through a route that may include a link between two switches or routers that connect the source and the destination. The parking-lot topology may include a network topology that transmits network traffic from a source to a destination through a route that may include one or more links between a number of switches or routers that connect the source and the destination. A default QCN configuration may be used in an evaluation of the FQCN computation. The evaluation may include values of w=2, $G_d$=1/128, T=15 ms, $S_T$=5, $B_L$=150 kilobytes (KB), $R_{AI}$=5 Mbps and $R_{HAI}$=50 Mbps when the link capacity of a switch is 10 Gbps, while $R_{AI}$=0.5 Mbps and $R_{HAI}$=5 Mbps when the link capacity of the switch is 1 Gbps.

In an example scenario, a simulation of the congestion management system may use the dumb-bell topology, as shown in the diagram 300, or the parking-lot topology. In the dumb-bell topology and the parking-lot topology, links may connect switches, sources (304, 312) and destinations (306, 314). The sources (304, 312) and the destinations (306, 314) may be end hosts. The switches may have link capacity of 10 Gbps and 50 μs round-trip time (RTT) delay. In each topology, the congestion controller 302 may be connected to the switches to determine the congestion status information and implement congestion management. The links between the congestion controller 302 and switches may have a link capacity of 1 Gbps and 100 μs RTT delay. A congestion detector may be incorporated into each one of the switches.

A traffic flow monitor and a congestion reaction coordinator are attached to each one of the end hosts that includes the sources (304, 312) and the destinations (306, 314). The traffic flow monitor may update flow rates every 1 ms.

The simulation may include experiments with static backlogged traffic flows in the dumbbell topology and the parking-lot topology. The static backlogged traffic flows may be used to validate that the FQCN computation incorporated in the congestion management system may allocate fair share rates among the end hosts and maintain a queue length stability. Constant bit rate (CBR) traffic flow may be used to simulate the static backlogged traffic flows in the simulation. 150 KB of switch buffers may be used and the equilibrium queue length $Q_{eq}$ may be set to 33 KB.

In the dumbbell topology, four static backlogged traffic flows may be initiated simultaneously to traverse through a single bottleneck link between a router $R_1$ 308 associated with the congestion and a router $R_2$ 310. The switch service rate may decrease from 10 Gbps to 1 Gbps and may increase back to 10 Gbps at a two and a four second of the simulation time, respectively. The traffic flow rates of each traffic flow and the switch queue length between the router $R_1$ 308 and the router $R_2$ 310 may be represented by a graph 322 and a graph 324, respectively, in a diagram 320. In the parking-lot topology, six static backlogged traffic flows, which may transmit data from a source i to a destination i (i∈[1,6]), may be initiated in sequence at an interval of 1 second. The transmission rates of each traffic flow and the queue length between the router $R_1$ 308 and the router $R_2$ 310, the router $R_2$ 310 and a router $R_3$, and the router $R_3$ and a router $R_4$ may be represented by a graph 326 and a graph 328, respectively, in the diagram 320. The experiments may validate that the FQCN computation (that may be implemented in the congestion management system) may successfully allocate fair share rates to each one of the backlogged traffic flow while maintaining the queue length stabilized in an optimum equilibrium queue length, such as 33 KB. Similar results may be obtained in the dumbbell topology and parking-lot topology with the RTT delay between the congestion controller 302 and switches increased to 0.1 ms.

The examples in FIGS. 1 through 3B have been described using specific systems and processes in which a congestion management system for a datacenter network may be implemented. Embodiments for a congestion management system for a datacenter network are not limited to the systems and processes according to these examples.

Figure 4:
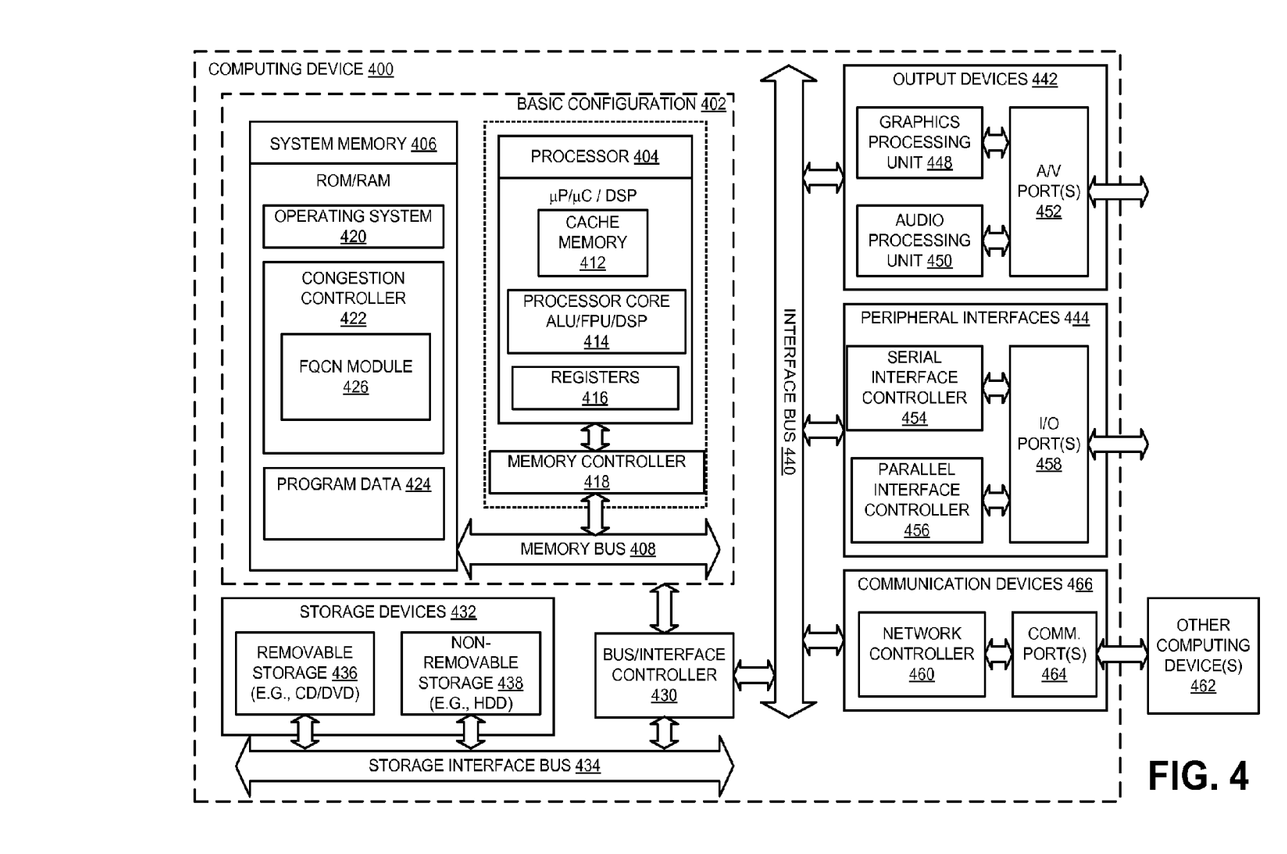
FIG. 4 illustrates a general purpose computing device, which may be used to provide a congestion management system for a datacenter network.

FIG. 4 illustrates a general purpose computing device, which may be used to provide a congestion management system for a datacenter network, arranged in accordance with at least some embodiments disclosed herein.

For example, a computing device 400 may be used to provide computer program products related to a congestion management system for a datacenter network. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.), or any combination thereof. The system memory 406 may include an operating system 420, data of a congestion controller 422, and a program data 424. The congestion controller 422 may include an FQCN module 426. The program data 424 may include, among other data, a congestion status, a flow rate information, and a congestion status information, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices may include magnetic disk devices, such as flexible disk drives and hard-disk drives (HDDs), optical disk drives such as compact disc (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 406, the removable storage devices 436, and the non-removable storage devices 438 may be examples of computer storage media. Computer storage media may include, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 may include a graphics processing unit 448 and an audio processing unit 450, which may be configured to communicate to various external devices, such as a display or speakers via one or more A/V ports 452. One or more example peripheral interfaces 444 may include a serial interface controller 454 or a parallel interface controller 456, which may be configured to communicate with external devices, such as input devices (for example, keyboard, mouse, pen, voice input device, touch input device, etc.) or other peripheral devices (for example, printer, scanner, etc.) via one or more I/O ports 458. An example communication device 466 may include a network controller 460, which may be arranged to facilitate communications with one or more other computing devices 462 over a network communication link via one or more communication ports 464. The one or more other computing devices 462 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 400 may be implemented as a part of a general purpose or specialized server, mainframe, or similar computer, which includes any of the above functions. The computing device 400 may also be implemented as a personal computer including both laptop computer and non-laptop computer configurations.

Example embodiments may also include methods to provide a congestion management system for a datacenter network. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 5:
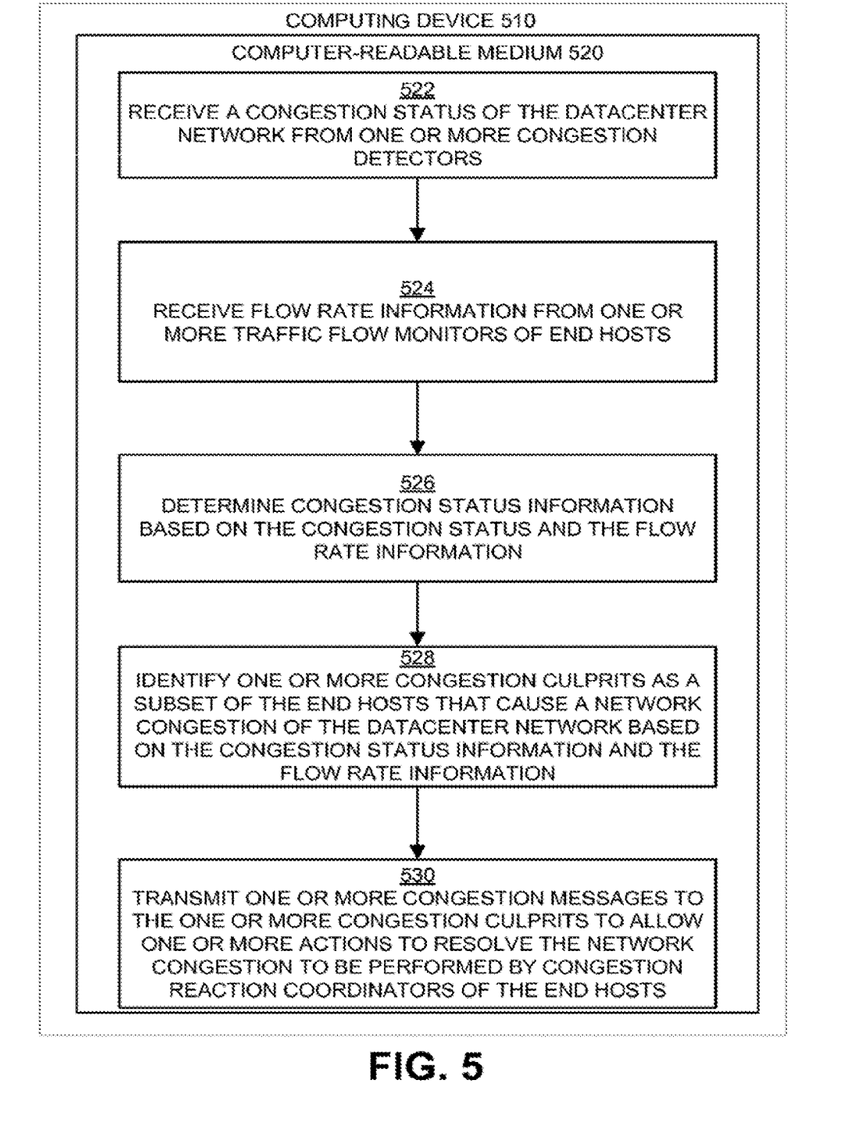
FIG. 5 is a flow diagram illustrating an example method to provide a congestion management system for a datacenter network.

FIG. 5 is a flow diagram illustrating an example method to provide a congestion management system for a datacenter network which may be implemented through a congestion controller (202, and 302) which may be an example of a computing device 400, arranged in accordance with at least some embodiments disclosed herein.

Example methods may include one or more operations, functions, or actions as illustrated by one or more of blocks 522, 524, 526, 528, and 530, and may, in some embodiments, be performed by a computing device such as the computing device 400 in FIG. 4. The operations described in the blocks 522-530 may also be stored as computer-executable instructions in a computer-readable medium such as a computer-readable medium 520 of a computing device 510.

An example process for providing congestion management for a datacenter network may begin with block 522, "RECEIVE A CONGESTION STATUS OF THE DATACENTER NETWORK FROM ONE OR MORE CONGESTION DETECTORS," where the congestion controller 202 may receive the congestion status from congestion detectors, where each one of the congestion detectors are associated with a switch of the datacenter network.

Block 522 may be followed by block 524, "RECEIVE FLOW RATE INFORMATION FROM ONE OR MORE TRAFFIC FLOW MONITORS OF END HOSTS," where the congestion controller 202 may receive the flow rate information from the traffic flow monitors, in which each one of the traffic flow monitors are associated with an end host.

Block 524 may be followed by block 526, "DETERMINE CONGESTION STATUS INFORMATION BASED ON THE CONGESTION STATUS AND THE FLOW RATE INFORMATION," where the congestion status information may be determined.

Block 526 may be followed by block 528, "IDENTIFY ONE OR MORE CONGESTION CULPRITS AS A SUBSET OF THE END HOSTS THAT CAUSE A NETWORK CONGESTION OF THE DATACENTER NETWORK BASED ON THE CONGESTION STATUS INFORMATION AND THE FLOW RATE INFORMATION," where one or more congestion culprits may be identified.

Block 528 may be followed by block 530, "TRANSMIT ONE OR MORE CONGESTION MESSAGES TO THE ONE OR MORE CONGESTION CULPRITS TO ALLOW ONE OR MORE ACTIONS TO RESOLVE THE NETWORK CONGESTION TO BE PERFORMED BY CONGESTION REACTION COORDINATORS OF THE END HOSTS," where congestion messages may be transmitted to the one or more congestion culprits.

Figure 6:
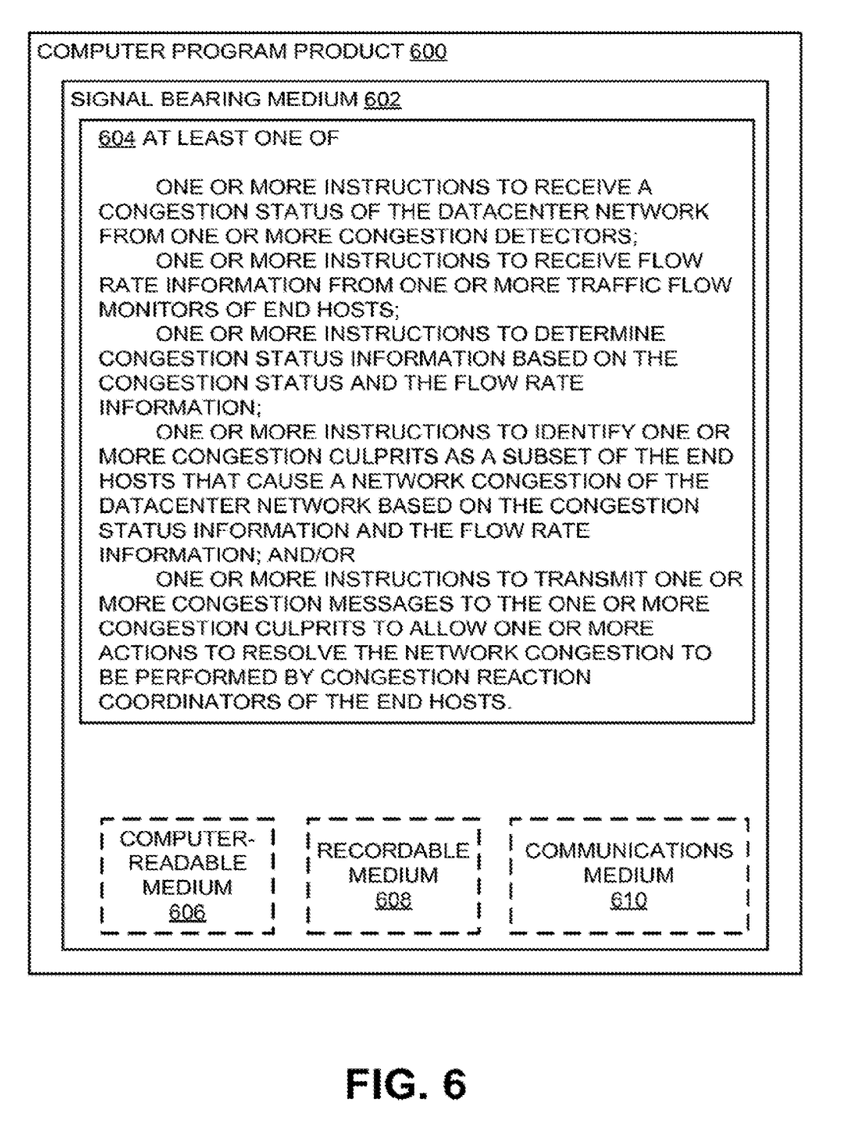
FIG. 6 illustrates a block diagram of an example computer program product to provide a congestion management system for a datacenter network, all arranged in accordance with at least some embodiments described herein.

FIG. 6 illustrates a block diagram of an example computer program product to provide a congestion management system for a datacenter network, arranged in accordance with at least some embodiments described herein.

In some examples, as shown in FIG. 6, a computer program product 600 may include a signal bearing medium 602 that may also include one or more machine readable instructions 604 that, when executed by, for example, a processor, may provide the functionality described herein. For example, referring to the processor 404 in FIG. 4, the congestion controller 422 and the FQCN module 426 may undertake one or more tasks shown in FIG. 6 in response to the instructions 604 conveyed to the processor 404 by the medium 602 to provide a congestion management system for a datacenter network, as described herein. Some of those instructions may include, for example, receiving a congestion status of the datacenter network from one or more congestion detectors, receiving flow rate information from one or more traffic flow monitors of end hosts, determining congestion status information based on the congestion status and the flow rate information, identifying one or more congestion culprits as a subset of the end hosts that cause a network congestion of the datacenter network based on the congestion status information and the flow rate information, and transmitting one or more congestion messages to the one or more congestion culprits to allow one or more actions to resolve the network congestion to be performed by congestion reaction coordinators of the end hosts.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). For example, the computer program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, a method executed at a congestion controller of a datacenter network may be described to provide congestion management for the datacenter network. The method may include receiving a congestion status of the datacenter network from one or more congestion detectors, receiving flow rate information from one or more traffic flow monitors of end hosts, determining congestion status information based on the congestion status and the flow rate information, identifying one or more congestion culprits as a subset of the end hosts that cause a network congestion of the datacenter network based on the congestion status information and the flow rate information, and transmitting one or more congestion messages to the one or more congestion culprits to allow one or more actions to resolve the network congestion to be performed by congestion reaction coordinators of the end hosts.

According to other examples, the method may further include determining the flow rate information of the end hosts by counting an amount of traffic measured in bytes for each one of transmissions from the end hosts. The transmission rates may be estimated from the flow rate information. In response to a determination that one or more of the end hosts include one or more of the transmission rates that exceed a rate threshold, the one or more of the end hosts may be identified as the one or more congestion culprits.

According to further examples, the method may further include locating the one or more congestion detectors at one or more switches of the datacenter network to allow the one or more congestion detectors to detect the congestion status through a queue based monitor scheme. A congested link between two of the end hosts may be determined through samples of transmission packets from the end hosts based on a sampling probability. A congestion value may be computed from the samples. In addition, in response to a determination that the congestion value is a negative value, the congested link may be identified and the congested link and addresses of the two of the end hosts may be transmitted as the congestion status information from the one or more congestion detectors to the congestion controller.

According to other examples, the method may further include executing a congestion control intelligence computation based on the congestion status information and the flow rate information to determine the network congestion and transmitting the one or more congestion messages to the one or more congestion culprits through a multicast transmission. Fair share values may be estimated for traffic flows described within the flow rate information and the one or more congestion culprits may be determined from comparisons of the traffic flows to the fair share values. The network congestion may be resolved through a reduction of a transmission rate of each one of the one or more culprits by a subset of the congestion reaction coordinators associated with the one or more culprits. Furthermore, the network congestion may be resolved through an increase of a transmission rate of one or more of the end hosts that are not the one or more culprits by a subset of the congestion reaction coordinators of the one or more of the end hosts to recover a previously lost bandwidth and to probe for an available bandwidth of the datacenter network.

According to some examples, a system to manage network congestion for a datacenter network may be described. The system may include a congestion controller communicatively coupled to one or more congestion detectors, each of the one or more congestion detectors communicatively coupled to one or more traffic flow monitors and one or more congestion reaction coordinators of end hosts. The congestion controller may be configured to receive a congestion status of the datacenter network, receive flow rate information from the traffic flow monitors of the end hosts, determine congestion status information based on the congestion status and the flow rate information, identify one or more congestion culprits as a subset of the end hosts that cause the network congestion of the datacenter network based on the congestion status information and the flow rate information, and transmit one or more congestion messages to the one or more congestion culprits to allow the one or more congestion reaction coordinators to perform one or more actions to resolve the network congestion.

According to other examples, the one or more traffic flow monitors may be further configured to count an amount of traffic measured in bytes for each one of transmissions from the end hosts to determine the flow rate information of the end hosts. Transmission rates may be estimated from the flow rate information and in response to a determination that one or more of the end hosts include one or more of the transmission rates that exceed a rate threshold, the one or more of the end hosts may be identified as the one or more congestion culprits.

According to further examples, the one or more congestion detectors may be further configured to determine a congested link between two of the end hosts through samples of transmission packets from the end hosts based on a sampling probability and compute a congestion value from the samples. In response to a determination that the congestion value is a negative value, the congested link may be identified and the congested link and addresses of the two of the end hosts may be transmitted as the congestion status information to the congestion controller.

According to other examples, the congestion controller may be further configured to estimate fair share values for traffic flows described within the flow rate information, determine the one or more congestion culprits from comparisons of the traffic flows to the fair share values, and transmit the one or more congestion messages to the one or more congestion culprits through a multicast transmission.

According to further examples, the one or more congestion reaction coordinators may be further configured to resolve the network congestion through a reduction of a first transmission rate of each one of the one or more culprits by a first subset of the congestion reaction coordinators associated with the one or more culprits and resolve the network congestion through an increase of a second transmission rate of one or more of the end hosts that are not the one or more culprits by a second subset of the congestion reaction coordinators of the one or more of the end hosts to recover a previous lost bandwidth and to probe for an available bandwidth of the datacenter network.

According to some examples, a computer-readable non-transitory storage medium with instructions stored thereon to provide congestion management for a datacenter network may be described. The instructions, in response to an execution by a processor, may cause the processor to perform actions that are similar the actions described above.

There is little distinction left between hardware and software implementations of aspects of systems; the use of hardware or software is generally (but not all of the time, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof, as understood by a person having ordinary skill in the art. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of the disclosure.

The present disclosure is not to be limited in terms of the particular embodiments described in the application, which are intended as illustrations of various aspects. Many modifications and variations may be made without departing from the spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited by the terms of the appended claims, along with the full scope of equivalents to which such claims are entitled. It is to be understood that the disclosure is not limited to particular methods, reagents, compounds compositions or biological systems, which may, of course, vary. It is also to be understood that the terminology used herein is for the purpose of describing particular embodiments, and is not intended to be limiting.

In addition, those skilled in the art will appreciate that the mechanisms of the subject matter described herein are capable of being distributed as a program product in a variety of forms and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and application programs, one or more interaction devices, such as a touch pad or screen, and/or control systems including feedback loops and control motors (for example, feedback for sensing position and/or velocity of gantry systems; control motors for moving and/or adjusting components and/or quantities).

A system may be implemented using any suitable commercially available components, such as those found in data computing/communication and/or network computing/communication systems. The herein described subject matter sometimes illustrates different components contained within, or connected with, other different components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include, but are not limited to, physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or the application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed at a congestion controller of a datacenter network that is configured to provide congestion management for the datacenter network, the method comprising:
receiving a congestion status of the datacenter network from one or more congestion detectors;
receiving flow rate information from one or more traffic flow monitors of end hosts;
determining transmission rates for a traffic flow associated with the flow rate information;
determining congestion status information based on the congestion status and the flow rate information;
in response to a determination that a transmission rate of one or more of the end hosts exceeds a rate threshold,
identifying one or more congestion culprits as a subset of the end hosts that cause a network congestion of the datacenter network based on the congestion status information and the transmission rate for the traffic flow; and
transmitting one or more congestion messages to the one or more congestion culprits to allow one or more actions to resolve the network congestion to be performed by congestion reaction coordinators of the subset of the end hosts;
determining a congested link between two of the end hosts in response to sampling transmission packets from the two of the end hosts based on a sampling probability;
computing a congestion value from the samples of transmission packets; and
in response to a determination that the congestion value is a negative value,
identifying the congested link; and
transmitting the congested link and addresses of the two of the end hosts as the congestion status information from the one or more congestion detectors to the congestion controller.

2. The method of claim 1, further comprising:
determining the flow rate information of the end hosts by counting an amount of traffic measured in bytes for each transmission from the end hosts.

3. The method of claim 1, further comprising:
in response to a determination that one or more of the end hosts include one or more of the transmission rates that exceed a rate threshold, identifying the one or more of the end hosts as the one or more congestion culprits.

4. The method of claim 1, further comprising:
locating the one or more congestion detectors at one or more switches of the datacenter network to allow the one or more congestion detectors to detect the congestion status through a queue based monitor scheme.

5. The method of claim 1, further comprising:
executing a congestion control intelligence computation based on the congestion status information and the flow rate information to determine the network congestion; and
transmitting the one or more congestion messages to the one or more congestion culprits through a multicast transmission.

6. The method of claim 5, wherein executing the congestion control intelligence computation comprises:
estimating fair share values for traffic flows described within the flow rate information; and
determining the one or more congestion culprits from comparisons of the traffic flows to the fair share values.

7. The method of claim 1, further comprising:
resolving the network congestion through a reduction of the transmission rate of each of the one or more congestion culprits by a subset of the congestion reaction coordinators associated with each of the one or more congestion culprits.

8. The method of claim 1, further comprising:
resolving the network congestion through an increase of the transmission rate of one or more of the end hosts that are not the one or more congestion culprits by a subset of the congestion reaction coordinators of the one or more of the end hosts to recover a previously lost bandwidth and to probe for an available bandwidth of the datacenter network.

9. A system to manage network congestion for a datacenter network, the system comprising:
a congestion controller communicatively coupled to one or more congestion detectors, each of the one or more congestion detectors communicatively coupled to one or more traffic flow monitors and one or more congestion reaction coordinators of end hosts, wherein the congestion controller is configured to:
receive a congestion status of the datacenter network;

receive flow rate information from the traffic flow monitors of the end hosts;

determine transmission rates for a traffic flow associated with the flow rate information;

determine congestion status information based on the congestion status and the flow rate information;

in response to a determination that a transmission rate of one or more of the end hosts exceeds a rate threshold, identify one or more congestion culprits as a subset of the end hosts that cause the network congestion of the datacenter network based on the congestion status information and the transmission rate for the traffic flow; and transmit one or more congestion messages to the one or more congestion culprits to allow the one or more congestion reaction coordinators to perform one or more actions to resolve the network congestion;

determine a congested link between two of the end hosts in response to sampling transmission packets from the two of the end hosts based on a sampling probability;

compute a congestion value from the samples of transmission packets; and in response to a determination that the congestion value is a negative value, identify the congested link; and transmit the congested link and addresses of the two of the end hosts as the congestion status information to the congestion controller.

10. The system according to claim 9, wherein the congestion controller is further configured to:

estimate fair share values for traffic flows described within the flow rate information;

determine the one or more congestion culprits from comparisons of the traffic flows to the fair share values; and transmit the one or more congestion messages to the one or more congestion culprits through a multicast transmission.

11. The system according to claim 9, wherein the one or more congestion reaction coordinators are further configured to:

resolve the network congestion through a reduction of a first transmission rate of each of the one or more congestion culprits by a first subset of the congestion reaction coordinators associated with each of the one or more congestion culprits; and resolve the network congestion through an increase of a second transmission rate of one or more of the end hosts that are not the one or more congestion culprits by a second subset of the congestion reaction coordinators of the one or more of the end hosts to recover a previous lost bandwidth and to probe for an available bandwidth of the datacenter network.

12. A non-transitory computer-readable storage medium with instructions stored thereon to provide congestion management for a datacenter network, the instructions, in response to execution by a processor, cause the processor to:

receive a congestion status of the datacenter network;

receive flow rate information from traffic flow monitors of end hosts;

determine transmission rates for a traffic flow associated with the flow rate information;

determine congestion status information based on the congestion status and the flow rate;

in response to a determination that a transmission rate of one or more of the end hosts exceeds a rate threshold, identify one or more congestion culprits as a subset of the end hosts that cause a network congestion of the datacenter network based on the congestion status information and the transmission rate for the traffic flow;

transmit one or more congestion messages to the one or more congestion culprits; and perform one or more actions to resolve the network congestion;

determine a congested link between two of the end hosts in response to sampling transmission packets from the two of the end hosts based on a sampling probability;

compute a congestion value from the samples of transmission packets; and in response to a determination that the congestion value is a negative value, identify the congested link; and transmit the congested link and addresses of the two of the end hosts as the congestion status information to one or more congestion controllers.

13. The non-transitory computer-readable storage medium of claim 12, wherein the instructions further cause the processor to:

determine the flow rate information of the end hosts by counting an amount of traffic measured in bytes for each transmission from the end hosts.

14. The non-transitory computer-readable storage medium of claim 12, wherein the instructions further cause the processor to:

estimate fair share values for traffic flows described within the flow rate information;

determine the one or more congestion culprits from comparisons of the traffic flows to the fair share values; and transmit the one or more congestion messages to the one or more congestion culprits through a multicast transmission.

* * * * *

UNITED STATES PATENT AND TRADEMARK OFFICE
CERTIFICATE OF CORRECTION

| | | |
|---|---|---|
| PATENT NO. | : 9,544,233 B2 | Page 1 of 1 |
| APPLICATION NO. | : 14/436047 | |
| DATED | : January 10, 2017 | |
| INVENTOR(S) | : Ansari et al. | |

It is certified that error appears in the above-identified patent and that said Letters Patent is hereby corrected as shown below:

On the Title Page

Under "Primary Examiner", in Column 2, Line 1, delete "Pao Sinkantarakorn" and insert -- Pawaris Sinkantarakorn --, therefor.

In the Specification

In Column 1, Line 8, delete "§371" and insert -- § 371 --, therefor.

In Column 12, Lines 36-37, delete "the medium 602" and insert -- the signal bearing medium 602 --, therefor.

Signed and Sealed this
Twenty-fifth Day of April, 2017

Michelle K. Lee
*Director of the United States Patent and Trademark Office*